Filed July 14, 1967
PHOTOGRAPHIC REPRODUCTION OF PSEUDOSCOPIC
REAL IMAGE GENERATOR PLATES
3,533,690
3 Sheets-Sheet 1
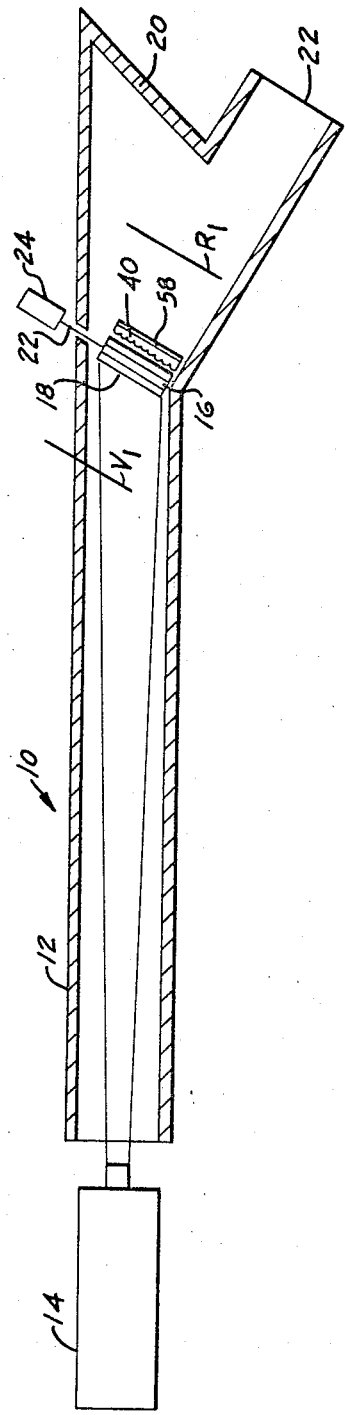
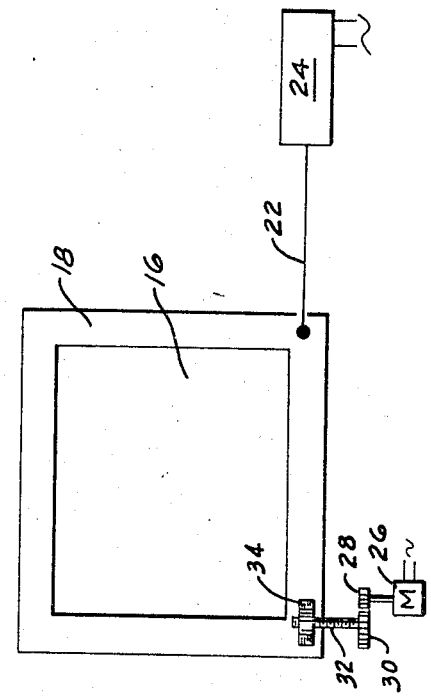
INVENTOR.
ROGER LANNES de MONTEBELLO
BY
MORGAN, FINNEGAN, DURHAM & PINE
ATTORNEYS

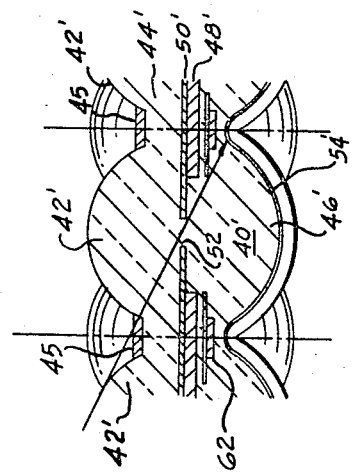
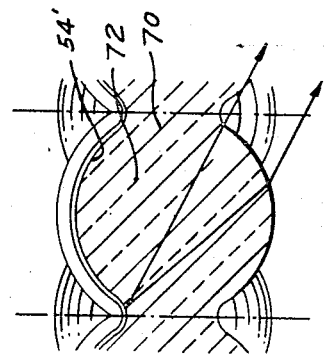
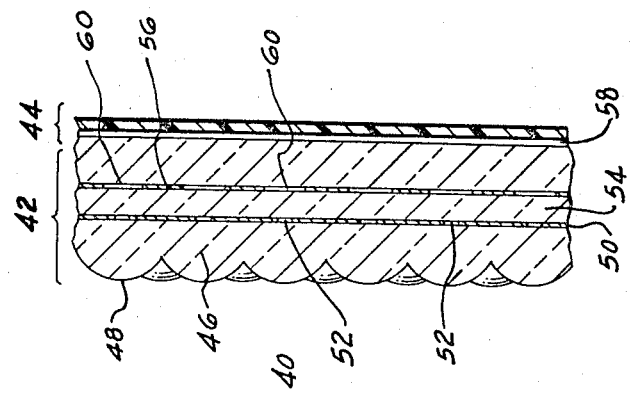

INVENTOR.
ROGER LANNES deMONTEBELLO
BY
MORGAN, FINNEGAN, DURHAM & PINE
ATTORNEYS

United States Patent Office 3,533,690
Patented Oct. 13, 1970

3,533,690
PHOTOGRAPHIC REPRODUCTION OF PSEUDO-
SCOPIC REAL IMAGE GENERATOR PLATES
Roger Lannes de Montebello, 165 E. 66th St.,
New York, N.Y. 10021
Filed July 14, 1967, Ser. No. 653,542
Int. Cl. G03b 27/32
U.S. Cl. 355—2                                    7 Claims

ABSTRACT OF THE DISCLOSURE

Improved integral photographs which are images of a three-dimensional object derived from pseudoscopic real images of first phase integral photographs or of holograms of said objects. Integral images of pseudoscopic real image generator plates reproducing three-dimensional objects are impaired by the apparent graininess of the generator plate. During the exposure to produce the integral image of the generator plate, the generator plate is minutely moved relative to the integral photographic assembly, in the plane of the generator plate, so that the apparently grainy record of the generator plate is rendered more smooth on the integral photographic emulsion, due to the smearing of the apparent grain during the exposure, the magnitude of the relative movement of the generator plate and integral photographic assembly being equivalent to the graininess of the record on the generator plate.

CROSS REFERENCE

The present application is an improvement on the invention of my prior U.S.A. patent application, Ser. No. 370,151 filed May 26, 1964, now abandoned. It is also an improvement on the direct vision stereoscopic system described by Lippmann in Académie des Sciences, Comptes Rendue 146, 1908, pp. 448–451.

BACKGROUND OF THE INVENTION

My prior application Ser. No. 370,151 filed May 26, 1964, now abandoned, discloses the process of producing integral stereoscopic photographs of an object through the use of holograms. These reproductions of the holograms, however, suffer from the fact that the photographic emulsion under the reconstructing coherent illumination used to make the hologram and that reproducing the original image produce an apparent graininess which is sufficiently coarse that the integral stereoscopic reproduction of it is of impaired quality. The present invention provides a simple means and method of overcoming or compensating for the apparent graininess of the holographic image so that the resultant or integral stereoscopic photographs are seen in more detail and without reproduction of the apparent grain of the pseudoscopic real image of the hologram.

The paper by Lippmann disclosed apparatus and a method for producing positives of a pseudoscopic integral photograph negative. While Lippmann does not appear to have been aware of the fact that his image was pseudoscopic, it turns out that his method of production has also the property of converting the pseudoscopic real image generated by the original integral plate into a stereoscopic, part real, part virtual, image. Under most conditions, however, the reproduction suffers from a certain degree of organized graininess or "moire," which defect is eliminated by the present invention.

As used herein, the term "pseudoscopic real image generator plate" includes both holograms and first generation integral photograms.

SUMMARY OF INVENTION

According to the present invention, means are provided for viewing and photographing a pseudoscopic real image generator plate suitably lighted, preferably by a laser in the case of a hologram, and so arranged that the real image of the generator plate may be photographed on a radiation sensitive lyer positioned behind a lenticular sheet provided with registered diaphragm apertures, one for each lenslet of the lenticular sheet, and field limiting apertures, also one for each lenslet, whereby the pseudoscopic real image of the generator plate is photographed by each one of the multiplicity of lenslets, each elemental image being parallaxially different from the adjacent images.

During the photographic exposure, as distinguished from my prior applications, the generator plate and the radiation sensitive layer with its associated lenticular sheet are moved or scanned in their planes with respect to each other to a minute degree, usually about 0.001 to 0.020 inch, for holograms, or the pitch of the lenslets, for integral photographs thereby scrambling the reproduction of the apparent grain or screen pattern in the generator plate image so that the individual "grains" or dots are blended in the integral photographic image, and are no longer individually visible.

In accordance with the present invention, I provide an improved method of and apparatus for producing a truly stereoscopic integral image of an object by use, for instance, of a hologram of the object, characterized by exposing a radiation sensitive layer preferably to monochromatic coherent radiation diffracted by said hologram to produce a real image of the object and refracted by a screen which is integral with said layer, the hologram and screen with its sensitive layer being continuously moved with respect to each other, and to a small extent, during the exposure, processing said exposed layer, and in polychromatic or white, diffuse or specular, illumination viewing said processed layer through said integral screen or another screen which is similar but has no diaphragm or aperture masks.

While it is preferred to illuminate the hologram by the coherent monochromatic light (e.g., at 6328 A.) from a laser, the hologram may be illuminated by a light from three lasers which may combine to form white light, or by a mercury vapor lamp, or even by a distant or collimated incandescent "point" source. The increased width of the light source results in an image which has less definition than when the hologram is illuminated by a laser, but is still useful.

Where the generator plate is a first generation integral photograph, it is, preferably diffusely, transilluminated with "white" or polychromatic light. Adjacent the integral photograph is positioned, in a substantially parallel planar relation, a lenticular sheet comprising closely packed lenslets with a radiation sensitive layer on the opposite side and lying substantially in the focal surface of the lenslets, whereby the pseudoscopic real image of the generator plate is focussed on said sensitive layer. In this relationship, the generator plate and lenticular sheet are moved laterally relatively to each other, while maintaining their parallel relationship, and this is preferably accomplished by vibrating one or the other of the members during the exposure of the sensitive layer to the real image of the generator plate, preferably causing the vibration to effect also a scanning, the extent of the vibration and of the scan or translation of the vibration preferably being about the diameter of an individual lenslet or pitch of the lenticular sheet.

As used herein, the term "apparent graininess" refers to the random spatial structure resulting from the multiple and random over-lapping interference fringes caused by the coherent illumination in a holographic image, as well as the regular pattern of the individual lenslets of an integral photograph.

BRIEF DESCRIPTION OF THE DRAWINGS

Of the drawings:

FIG. 1 is a schematic sectional view showing a form of apparatus according to the present invention;

FIG. 2 is a fragmentary schematic view showing two means for moving the lenticular sheet relative to the hologram;

FIG. 3 is a fragmentary cross-sectional view showing a lenticular sheet with its array of lenslets, registering diaphragms and radiation sensitive layer;

FIG. 4 is a cross-sectional view showing a more elaborate and preferred form of lenslet and associated radiation sensitive layer;

FIG. 4A is a similar view of a similar lenticular sheet for viewing the integram produced by the lens system of FIG. 4;

DESCRIPTION OF THE PREFERRED METHOD AND EMBODIMENTS

Figure 5:
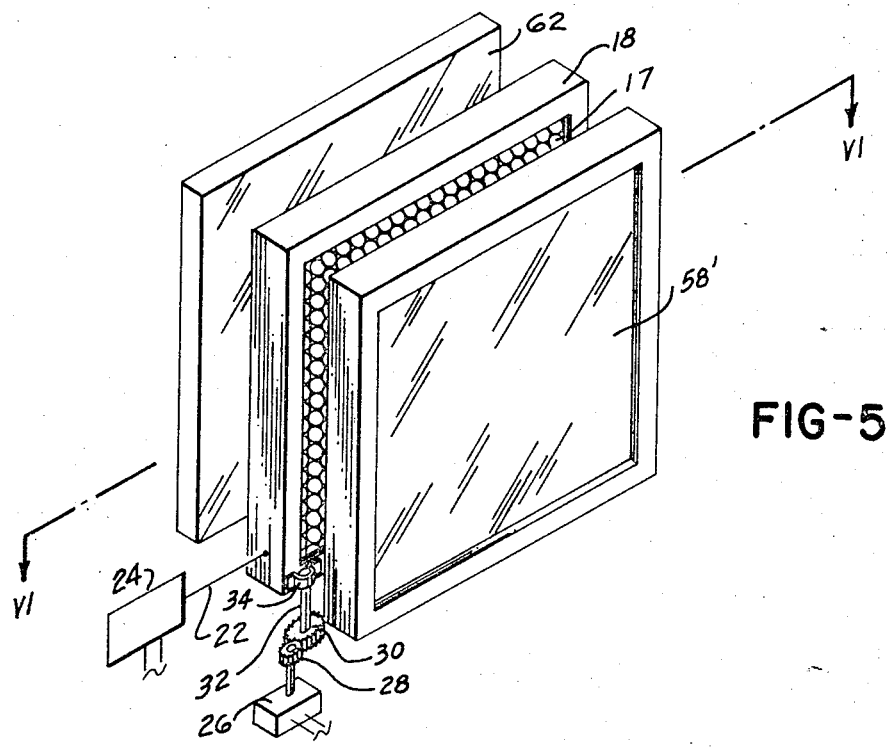
FIG. 5 is a schematic perspective view showing the exposure of a sensitive layer behind a lenticular sheet to the pseudoscopic real image of an integral photograph.

FIG. 1 shows apparatus used to display holograms produced by a wave-front reconstruction technique and is useful as an aid to understanding the present invention. The apparatus 10 comprises an optional radiation-tight housing 12 and a source 14 of monochromatic coherent radiation; for example, a continuous helium-neon laser. An exposed and processed hologram 16 is held in its frame 18 for rigidity transversely with respect to the plane of the hologram. $R_1$ and $V_1$ are the real and virtual three-dimensional images of the first order produced when the hologram is irradiated by monochromatic coherent radiation (e.g., laser light at 6328 angstroms). An optional radiation trap 20 blocks the direct radiation from laser 14 and observation may be made through viewing port 22 from points, such as 0, of the first order real image $R_1$.

The drawings are schematic representations of the images resulting and occurring during the process of the present invention. The rays indicated are for explanation purposes only, and not necessarily those that would occur during actual practice of the invention.

The hologram is shown tilted at an angle from the axis of projection of the coherent source. The angle formed between the axis of the hologram and the axis of the coherent source may approach 45° at the choice of the operator and is mounted for minute lateral and vertical movement in the plane of the hologram. For purposes of display, it has been found preferable that the final hologram be arranged as close as possible to the integral plate in order that the aperture of this system or acceptance angle be preserved as wide as possible. Therefore, it is desirable that the distance and arrangement of subject and the orientation of the hologram during the exposure by which it is formed should be such that the hologram will lend itself to a parallel orientation and close proximity with the integral plate during the exposure of the latter.

In FIG. 1 the hologram 16 has been positioned so that a first order real image $R_1$ is projected in the direction of the viewing port 22. The virtual image $V_1$ is formed in the general direction of the light source 14.

A lenticular plate 40 is placed facing the hologram 16, preferably parallel and close to it. The radiation sensitive emulsion 58 is protected from stray radiation before and after exposure until processing, for instance by use of a plate holder with a cover slide (not shown) which may be removed for exposure. The radiation sensitive layer 58 of the lenticular plate 40 is preferably exposed to monochromatic coherent radiation transmitted and diffracted by the hologram 16. The hologram's real image is intercepted by the lenticular screen; the rays contributing to the image formation are focused by the lenslets onto the radiation sensitive layer, thereby forming the desired array of minute images, one behind each lenslet. The hologram image being always positive, the lenticular record is preferably processed by reversal or optically copied after processing to produce a positive of the same size, enlarged or reduced from the size of the original, or simply printed by contact, if the sensitive layer is flat.

FIG. 2 is a schematic view showing the hologram plate 16 mounted in a frame 18 and connected by a push-pull rod 22 to an electrically energized vibrator 24 which is adapted to vibrate the plate 16 and its frame 18 laterally in a plane parallel to the face of the plate 16. Vibrator 24 is suitably energized, as by alternating current at 60 cycles so as to produce a rapid vibration during the exposure period. The vibrator 24 is adjustable as to the amplitude of its vibration so that the frame 18 and plate 16 may be vibrated from 0.001 to 0.020 inch, or more in the case of an integral generator plate. Instead of a vibrator, the frame 18 and plate 16 may be moved stepwise.

The integral plate 40 is preferably mounted close to the hologram 16, conveniently about a small fraction of an inch therefrom. The further the plate 40 is spaced from the hologram 16, the narrower the angle of view of the hologram recorded on the integral photographic layer 58.

Means are also provided for vertically moving or translating the generator plate 16 at a relatively slow rate while the plate 16 is laterally vibrated, the extent of translational movement being substantially equal in its single pass to the amplitude of the faster vibrational movement. Alternatively, the generator plate 16 is moved laterally and vertically in small step-by-step increments. For this purpose, the translating means illustratively comprises a motor 26 driving a pinion 28 which meshes with a gear 30 to drive threaded shaft 32 which is in meshing engagement with a threaded bracket 34 mounted on frame 18, so that operation of motor 26 slowly raises the frame 18 and generator plate 16, preferably step-by-step in small increments, so that the scan lines produced by the vibration are blended on the sensitive layer 58.

FIG. 3 shows a typical integral plate of the lenticular type which is useful in practice of this invention. The lenticular plate 40 is in general made up of two parts: A lenticular screen 42 and a film 44 coated with a radiation sensitive layer 58. The lenticular screen 42 is further comprised of a sheet 46 which may be a polyester resin or other optically transparent, refractive material. A plurality of closely spaced lenslets 48 are formed on the front face of the sheet 46. An opaque layers 50 which may be an apertured thin metal sheet is embedded to the opposite side of the sheet 46. Layer 50 has a plurality of aperture diaphragms 52 each located substantially at the center of curvature of a lenslet 48. A transparent backing layer 54 which may be a polyester resin, is affixed to the optically opaque layer 50 and serves to strengthen the plate and act as a spacer for providing the proper distance to the film, so as to place the radiation sensitive layer substantially in the focal plane of the lenslets.

Embedded in the backing layer 54 is an apertured metal sheet 56, the apertures 60 of which are larger than the diagram apertures 52 and are coaxial therewith. These apertures 60 serve as field limiting apertures so that the images formed by one lenslet do not overlap those formed by the adjacent lenslets.

For viewing, the exposed and processed film, if reversal film is used (or a positive print, if the layer 58 is a negative layer) is positioned against a similar lenticular sheet which is substantially a duplicate of that shown in FIG. 3 except that the radius of curvature of the lenslets may be appropriately larger, and the diaphragm sheet 50 and aperture sheet 56 are preferably omitted to provide greater illumination.

FIGS. 4 and 4A show alternative and preferred forms of lenticular sheets for taking and viewing integral photographs of the pseudoscopic real image generator plate.

In FIG. 4 is shown in greatly enlarged form, a cross-sectional view of a single lens element 40' of an integral lenticular network sheet extending laterally in all directions from the element shown, each lenslet being formed by minute portions of two superimposed, registered sheets, which may be integrated, the many lens elements 40' being hexagonally arranged. The upper portion of the lens element 40' is formed as a plano-convex lenslet 42', in at least coaxial register with lenslet 40'. The lenslet 42' is joined to the adjacent lenslets of the same side by flat portions 44'.

The flats between adjacent lenslets 42 are preferably provided with opaque masking surfaces 45, so as to prevent extraneous light and flare from reaching the film 54.

The lower portion of the lens element 40' is formed as a plano-convex lens element 46'. Between the upper and lower lenslets 42' and 46' is positioned a sheet 48 preferably of metal, having parallel faces, one face being in the plane of the principal points of the lenslets, preferably as a separate layer 50' provided with diaphragm apertures 52, each of which is concentrically registered with its respective lenslet 42'. Parallel to sheet 48' is a separate apertured metal layer 62 with larger coaxial field limiting apertures, which layer is also embedded in the plastic of the lenticular sheet.

In intimate registered contact with the back-side of the lenticular network sheet is a sheet of radiation sensitive film 54', suitably embossed to fit closely to and register with the convex surfaces of the lenslets 46' with the sensitive or emulsion layer adjacent to the surface of the lenslets 46'.

The radiation sensitive film may have a layer which is sensitive to infra-red, visible or ultra violet radiation and which is adapted to produce, after processing, monochrome (black and white) negative or positive images or, color negative or reversal images. (Where a monochrome or color negative film is used, the subsequent exposure will be on sensitive film to produce a corresponding positive transparency, while if reversal film is used for the first exposure, it may be reproduced on reversal material in black and white or color, as the case may be, for enlarged or reduced, transmitted or reflected, illumination viewing.)

The process of the present invention is preferably carried out using embossed film to fit against the convex surfaces of the lenslets 46', and is also preferably carried out using monochrome or color reversal film.

After exposure, the film 54' is removed and processed to reveal its images and then is positioned against the far side of the lenticular surface of a viewing lenticular network sheet 70 with the concave image-bearing portions of the film 54' in close, intimate and registering contact with the rear convex surfaces of the viewing lenslets 72 forming the lenticular network sheet 70 as shown in FIG. 4A. This sheet 70 has lenslets of such size and pitch that this film 54', after proper humidification or dehumidification can be made to conform without excessive stresses. Usually, the film is transparently cemented to the lenticular surface of the network sheet 70.

For viewing, the assembly of the image-bearing film 54' and the lenticular sheet 70 is preferably illuminated by light-diffusing sheet (not shown) which may be positioned on the far side so that the film images are viewed through the lenslets 72.

The acceptance angle of the lenslets 42', that is the angle formed by one edge of the back lenslet 46' interstice or the film interstice, the principal point, which is also the center of curvature, of the front lenslets 52' and the normal to the lenslets, is limited by the field limiting mask elements 45 and/or 62 so that an image formed by any one of the lenslet assemblies 40' on the film 54' does not overlap the image formed by the adjacent lenslets. The lenslets 72 of the viewing stage, similar to lenslets 72' of the first stage, while having no field limiting masks, are so proportioned that the eyes cannot see in focus the images of neighboring lenslets.

The masks of the taking networks are preferably generally hexagonal, for the types of network having a honeycomb formation of lenslets, so that images are mutually tangent and that, together, they will substantiall fill all of the film area.

In FIGS. 4 and 4A, the lenslets are concentric, which implies that the refractive index is about $n=1.8$. For lower refractive indices the pairs of lenslets are coaxial, the distance between centers of curvature being an inverse ratio to the refractive index.

Figure 6:
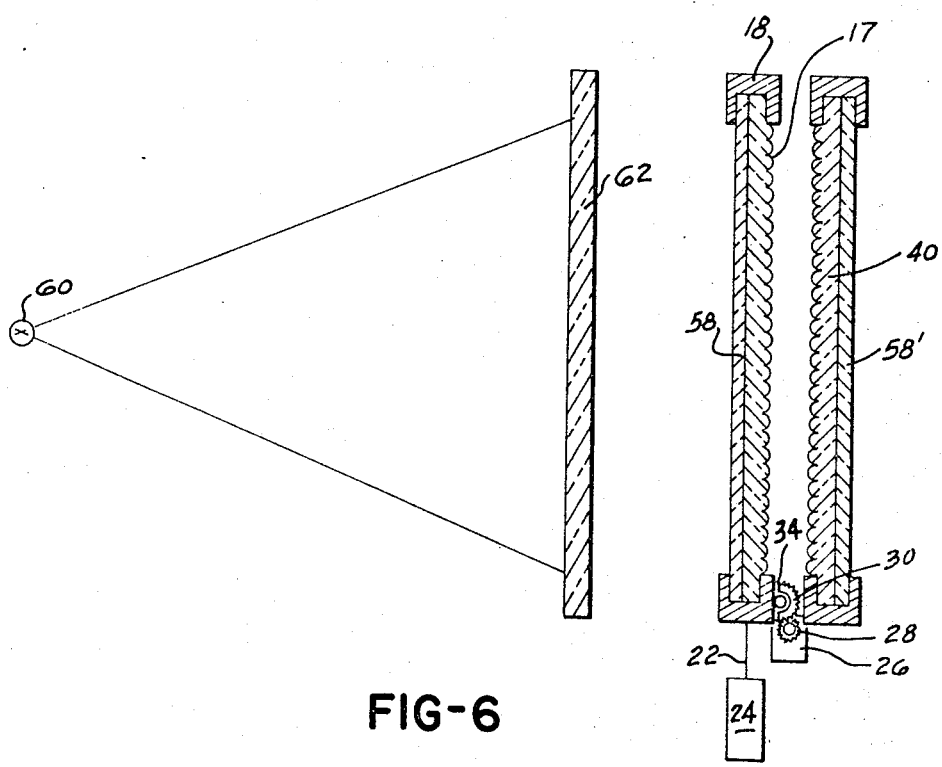
FIG. 6 is a schematic transverse sectional view of the assembly otherwise shown in FIG. 5.

FIGS. 5 and 6 schematically illustrate a modified process according to the present invention according to which a pseudoscopic integral photograph forms the pseudoscopic real image generator plate and is photographed on a sensitive sheet on which the images of the generator plate are focused by means of a lenticular sheet facing the generator plate, the lenticular sheet with the sensitive sheet and the generator plate being moved laterally and vertically relative to each other during the exposure.

The generator plate comprises a lenticular sheet 17 with the film 58 bearing the pseudoscopic image generating elemental images as shown in FIG. 3. The lenticular sheet 17 with its film 58 is mounted in the frame 18 and is connected by push-pull rod 22 to an electrically energized motor 24 which is adapted to vibrate the sheet 17 or move it laterally in a step-wise fashion, as explained in connection with FIG. 2. The amplitude of the vibration or total lateral movement is preferably about the diameter of an individual lenslet of the sheet 17.

Translating means for the frame 18 and plate 17 are provided and may be of the same type and operate in the same manner as described in connection with the structure shown in FIG. 2.

Closely adjacent the integral photograph constituting the generator plate in this modification is a second lenticular sheet 40 and its unexposed film layer 58', the images formed by the lenslets being focussed on the films 58'.

The generator plate 17 is transilluminated, preferably by diffuse light which may be white or polychromatic, as from a point source or electric lamp 60 with a translucent diffusing sheet 62 interposed between the light source and the generator plate 17.

After processing, the film layer 58' is mounted on a lenticular sheet for viewing as described above in connection with the first embodiment.

The lenticular sheets of FIGS. 4 and 4A may likewise be used in reproducing and viewing an integral photograph reproducing the pseudoscopic integral photograph, as in FIGS. 5 and 6. The pitch and size and number of the lenslets in one plate do not have to match those in the other plate.

The invention in its broader aspects is not limited to the specific steps and mechanisms shown and described but departures may be made therefrom within the scope of the accompanying claims without departing from the principles of the invention and without sacrificing its chief advantages.

What is claimed is:

1. The method of producing a stereoscopic integral image of the image of a pseudoscopic real image generator plate in which a radiation sensitive layer is exposed behind a lenticular sheet focusing parallaxially different images of the pseudoscopic image on said layer, characterized in that said generator plate and lenticular sheet with its sensitive layer are moved relatively to each other by stepwise lateral movement and stepwise translation in a plane parallel to the generator plate during the exposure of said layer.

2. A method according to claim 1 which the generator plate is a hologram.

3. A method according to claim 1 in which the generator plate is an integral photograph.

4. Apparatus for photographing a pseudoscopic real image generator plate to form an integral photograph which comprises means for illuminating said generator plate, a lenticular sheet parallel to the generator plate and having closely packed lenslets focusing their images of the generator plate on a sensitive layer, and means for moving said generator plate and lenticular sheet relatively to each other during the exposure of the sensitive layer comprising a first means for vibration and a second means for translation, the translation being effected at such a slower rate relatively to the vibration that substantially contiguous and blending scan lines are obtained on the sensitive layer.

5. Apparatus according to claim 4 in which the first vibrating means provides for step-wise lateral movement and of the second means provides for step-wise translation, so that substantially contiguous and blending scan lines are obtained on the sensitive layer.

6. Apparatus according to claim 4 in which the lenticular sheet comprises lenslets each of which is provided with a diaphragm.

7. Apparatus for taking an integral photograph produced in accordance with claim 4 which comprises a lenticular sheet composed of an array of closely packed lenslets and a photographic layer associated with said lenticular sheet, said lenticular sheet having a diaphragm and field limiting members for each of its lenslets to prevent overlap of the several images formed by the lenslets.

References Cited

UNITED STATES PATENTS 3,300,266    1/1967    Browning _____ 350—96

NORTON ANSHER, Primary Examiner

R. A. WINTERCORN, Assistant Examiner

U.S. Cl. X.R.

350—130, 134; 355—22

UNITED STATES PATENT OFFICE

CERTIFICATE OF CORRECTION

Patent No. 3,533,690      Dated October 13, 1970

Inventor(s) Roger L. de Montebello

It is certified that error appears in the above-identified patent and that said Letters Patent are hereby corrected as shown below:

Column 2, line 5, "lyer" should read -- layer -- ;

Column 3, line 16, "integram" should read -- integral photograph -- ;

Column 6, line 4, "72'" should read -- 42' -- .

Signed and sealed this 30th day of March 1971.

(SEAL)
Attest:

EDWARD M. FLETCHER. JR.
Attesting Officer

WILLIAM E. SCHUYLER, JR.
Commissioner of Patents